United States Patent
Blacken et al.

(10) Patent No.: US 11,167,690 B2
(45) Date of Patent: Nov. 9, 2021

(54) ACCENT LIGHTING SYSTEM FOR AN INTERIOR CABIN OF A VEHICLE

(71) Applicant: THE BOEING COMPANY, Chicago, IL (US)

(72) Inventors: Lars Eric Blacken, Bothell, WA (US); Jing Ma, Oakdale, MN (US); William H. Valentine, Jr., Mill Creek, WA (US); Paul Joseph Wilcynski, Seattle, WA (US)

(73) Assignee: The Boeing Company, Chicago, IL (US)

( * ) Notice: Subject to any disclaimer, the term of this patent is extended or adjusted under 35 U.S.C. 154(b) by 659 days.

(21) Appl. No.: 15/189,176

(22) Filed: Jun. 22, 2016

(65) Prior Publication Data

US 2017/0368990 A1 Dec. 28, 2017

(51) Int. Cl.
*B60Q 3/20* (2017.01)
*B60Q 3/62* (2017.01)
*B60Q 3/44* (2017.01)
*B64D 11/00* (2006.01)

(52) U.S. Cl.
CPC .............. *B60Q 3/20* (2017.02); *B60Q 3/44* (2017.02); *B60Q 3/62* (2017.02); *B60Q 2900/10* (2013.01); *B64D 2011/0038* (2013.01); *B64D 2011/0053* (2013.01)

(58) Field of Classification Search
CPC ........... F21V 19/02; F21V 5/008; B60Q 3/20; F21W 2107/30; F21S 8/024
See application file for complete search history.

(56) References Cited

U.S. PATENT DOCUMENTS

| | | | |
|---|---|---|---|
| 2004/0213005 A1* | 10/2004 | Kohlmeier-Beckmann | F21V 7/0008 362/471 |
| 2006/0028834 A1* | 2/2006 | Miller | F21S 8/02 362/551 |
| 2008/0137345 A1* | 6/2008 | Wimberly | F21V 3/04 362/299 |
| 2011/0164429 A1* | 7/2011 | Heym | B60Q 3/44 362/471 |
| 2012/0287621 A1* | 11/2012 | Lee | F21V 5/002 362/231 |
| 2013/0063951 A1* | 3/2013 | Beier | G09F 9/33 362/311.1 |
| 2013/0208473 A1* | 8/2013 | Palagashvili | B64D 11/00 362/246 |
| 2014/0328060 A1* | 11/2014 | Gadegaard | F21V 7/09 362/235 |

(Continued)

*Primary Examiner* — Jong-Suk (James) Lee
*Assistant Examiner* — Eric T Eide
(74) *Attorney, Agent, or Firm* — The Small Patent Law Group LLC; Joseph M. Butscher

(57) ABSTRACT

An accent lighting system is configured to provide accented light onto a desired location. The accent lighting system includes an accent adapter assembly that is configured to securely couple to a light source. The accent adapter assembly includes an accenting plate that is configured to accent light that is emitted from the light source. A method of securing an accent lighting system within an internal cabin of a vehicle includes removing an existing light source from an aperture of a composite panel, securing an accent adapter assembly to the existing light source to form the accent lighting system, and securing the accent lighting system in the aperture of the composite panel.

11 Claims, 11 Drawing Sheets

(56) References Cited

U.S. PATENT DOCUMENTS

| | | | |
|---|---|---|---|
| 2015/0276184 A1* | 10/2015 | Stathes | F21S 8/024 |
| | | | 362/296.01 |
| 2017/0045214 A1* | 2/2017 | Johnson | F21V 3/061 |
| 2017/0153004 A1* | 6/2017 | De Zwart | F21V 3/0436 |

\* cited by examiner

ACCENT LIGHTING SYSTEM FOR AN INTERIOR CABIN OF A VEHICLE

FIELD OF THE DISCLOSURE

Embodiments of the present disclosure generally relate to an accent lighting system that is configured to be used within an interior cabin of a vehicle.

BACKGROUND OF THE DISCLOSURE

Various vehicles include an internal cabin that houses numerous passenger seats. The passenger seats may be arranged in rows within the internal cabin. For example, a commercial airplane may include rows of seats with one or more aisles extending through the rows. Numerous lights are used to illuminate the internal cabin.

Aircraft operators may desire to provide lighting effects within the internal cabin. For example, lighting effects may be used to provide illuminated row indicators, seat locations, lavatory locations, and/or the like. As another example, lighting effects may be used to provide illuminated aesthetic features throughout the aircraft.

A known system for providing lighting effects within an internal cabin of an aircraft includes a bulky, heavy, and expensive light generator. For example, a known system includes a digital projector that is used to provide illuminated graphics and/or images within an internal cabin. However, known systems that include a digital projector, for example, add costs to a manufacturing process. Costly customized lighting systems are sometimes used in place of existing light sources that would otherwise be used within an internal cabin of an aircraft. Moreover, such customized lighting systems may be too large to fit within various confined spaces of an internal cabin. Additionally, a customized lighting system typically must first be certified (such as by the United States Federal Aviation Administration) for use within an aircraft.

SUMMARY OF THE DISCLOSURE

A need exists for a cost-effective, lightweight, and adaptable system, method, and assembly configured to provide lighting effects within an internal cabin of an aircraft. A need exists for an accent lighting system that that requires little to no additional certification for use within an internal cabin of an aircraft.

With those needs in mind, certain embodiments of the present disclosure provide an accent lighting system that is configured to provide accented light onto a desired location. The accent lighting system includes an accent adapter assembly that is configured to securely couple to a light source. The accent adapter assembly includes an accenting plate that is configured to accent light that is emitted from the light source.

In at least one embodiment, the accent adapter assembly includes a lens that is configured to capture the light emitted from the light source and direct the light into the accenting plate. The accent adapter assembly may also include another lens that is configured to focus accented light that passes through the accenting plate onto the desired location.

In at least one embodiment, the accent adapter assembly includes a sleeve that is configured to securely couple to the light source. The sleeve includes a base that is configured to securely couple to the light source, and a mounting tube. An adjustment housing has first and second ends. The first end is secured to the mounting tube. A bezel includes a securing base coupled to the second end of the adjustment housing, and an outer flange that is configured to be positioned over an aperture of a panel.

A coupling ring may be configured to secure to the light source. The sleeve may secure to the coupling ring. In at least one embodiment, the coupling ring defines a central passage that has a diameter that is substantially the same as a diameter of an aperture of a panel into which the light source is sized to secure into. The coupling ring may have a thickness that is substantially the same as a thickness of the panel.

The accent lighting system may include a first lens disposed within the sleeve. The accenting plate may also be disposed within the sleeve. A second lens may be disposed within the adjustment housing. A distance between the first and second lenses may be adjustable.

The first end of the adjustment housing may be adjustably secured to the mounting tube. In at least one embodiment, the adjustment housing includes a semi-spherical main body. The securing base of the bezel may be pivotally secured to the semi-spherical main body.

The accent adapter assembly may include one or both of a reflector or beam splitter within a light path.

The light source may include an existing light source within an internal cabin of a vehicle. The light source may be removed from a panel within the internal cabin and coupled to the accent adapter assembly to form the accent lighting system. The accent lighting system is secured to the panel.

Certain embodiments of the present disclosure provide a method of securing an accent lighting system within an internal cabin of a vehicle. The method includes expanding an aperture of a composite panel within the internal cabin of the vehicle, securing an accent adapter assembly to a light source to form the accent lighting system, and securing the accent lighting system in the expanded aperture of the composite panel. In at least one embodiment, the method includes removing an existing light source from the aperture of a composite panel before the expanding. In at least one embodiment, the accent adapter assembly is secured to the existing light source that was removed from the aperture.

Certain embodiments of the present disclosure provide a vehicle that includes an internal cabin, and a composite panel within the internal cabin. The composite panel includes an aperture. An accent lighting system is secured within the aperture of the composite panel and is configured to provide accented light onto a desired location within the internal cabin. The accent lighting system includes a light source, and an accent adapter assembly that securely couples to the light source. The accent adapter assembly includes an accenting plate that is configured to accent light that is emitted from the light source, a first lens that is configured to capture the light emitted from the light source and direct the light into the accenting plate, and a second lens that is configured to focus accented light that passes through the accenting plate onto the desired location. A distance between the first and second lenses may be adjustable.

DETAILED DESCRIPTION OF THE DISCLOSURE

Figure 1:
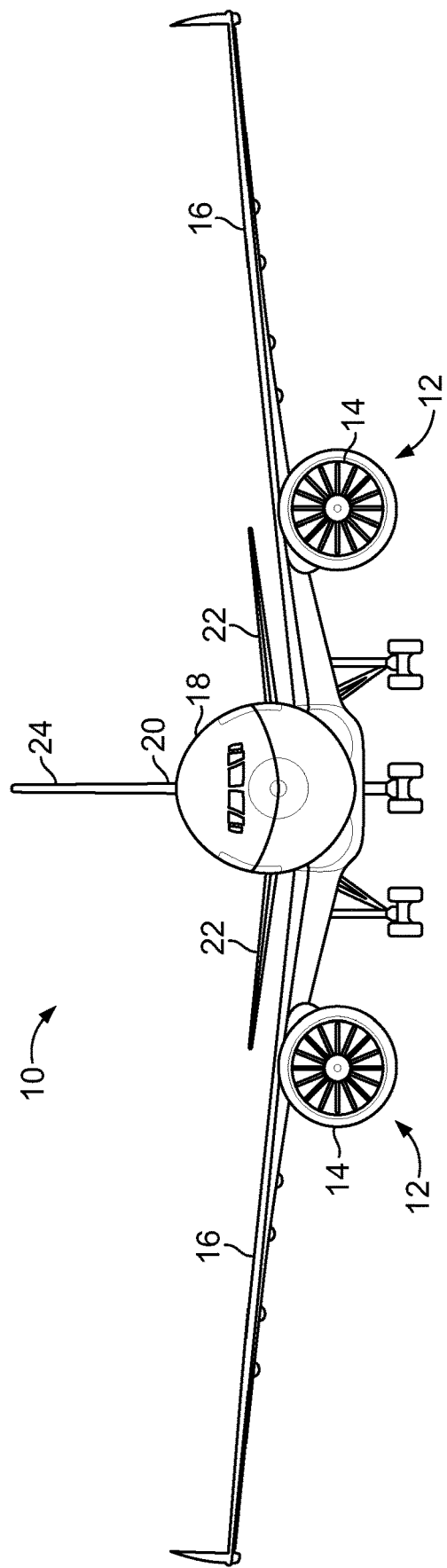
FIG. 1 illustrates a front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide an accent lighting system that is configured for use within an internal cabin of a vehicle, such as an aircraft. The accent lighting system includes an accent adapter assembly that is configured to be coupled to a light source. The light source may be an existing light source onboard an aircraft, such as an attendant work light within a galley, a reading light above a passenger seat, a task light within an attendant work area, a spot light, and/or the like. As such, the light source may already be certified for use within an internal cabin. In at least one embodiment, the accent adapter assembly is retrofit to an existing light source within an aircraft. The light source may be configured to emit white light and/or colored light.

The accent adapter assembly may secure to the light source through a coupling ring that is sized and shaped to mimic the thickness of an interior panel of a vehicle. For example, the light source may be sized and shaped to fit within an aperture formed through the interior panel. The coupling ring may have an internal opening that is the same (or substantially the same) diameter as the aperture. The thickness of the coupling ring may be the same (or substantially the same) as the thickness of an internal edge of the interior panel that defines the aperture. In this manner, the light source may securely connect to the coupling ring in the same or similar manner as the light source would otherwise securely connect within the aperture of the interior panel.

The coupling ring securely connects to a sleeve of the accent adapter assembly. The sleeve may connect to an adjustment housing, which may be semi-spherically shaped. An accenting plate (such as a gobo plate, mask, film, insert, and/or the like) may be secured within the sleeve and/or the adjustment housing. Light emitted from the light source passes through the accenting plate, which provides a lighting accent to the emitted light (such as by masking or otherwise blocking portions of the emitted light). One or more lenses within the sleeve and/or the adjustment housing may be used to focus the accented light onto a desired surface.

A bezel may couple to the adjustment housing. The bezel is configured to securely connect to an interior panel of the internal cabin. For example, the bezel is configured to secure into an aperture formed through the interior panel. The bezel may include a securing base defining a cavity that is configured to moveably secure over the adjustment housing. In this manner, the adjustment housing may be configured to be radially pivoted in relation to the bezel to direct the accented light at various locations.

Certain embodiments of the present disclosure provide an accent adapter assembly that is configured to couple to a light source. The accent adapter assembly includes a first end having a detachable ring that is configured to interface with a light source. The accent adapter assembly also includes a second end having a flange that is configured to interface with an aperture formed through a panel, such as an interior composite panel within an internal cabin of an aircraft. The accent adapter assembly may also include an intermediate portion that includes at least one lens, an accenting plate (such as a gobo slide or mask), and an articulation mechanism.

In at least one embodiment, the total length of the accent lighting system is less than 4 inches. It has been found that an accent lighting system having a length of less than four inches may be used within a wide variety of locations within limited space areas of an internal cabin of an aircraft. Alternatively, the length of the accent lighting system may be greater than 4 inches. In at least one embodiment, the accent adapter assembly includes one or both of a beam splitter and/or an internal reflector to provide a more compact accent adapter assembly.

Certain embodiments of the present disclosure provide a method of installing an accent lighting system within an internal cabin of a vehicle. The method includes removing an existing recessed lighting fixture installed in a composite panel, attaching an accent adapter assembly to the recessed lighting fixture, and securing the existing recessed lighting and attached lens housing fixture in the composite panel. In at least one embodiment, the securing includes slightly enlarging an aperture in the composite panel.

FIG. 1 illustrates a front view of an aircraft 10 (or aircraft assembly), according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), and one or more passenger sections (for example, first class, business class, and coach sections). Each of the sections may be separated by a cabin transition area, which may include one or more class divider assemblies. Overhead stowage bin assemblies may be positioned throughout the internal cabin.

Figure 2A:
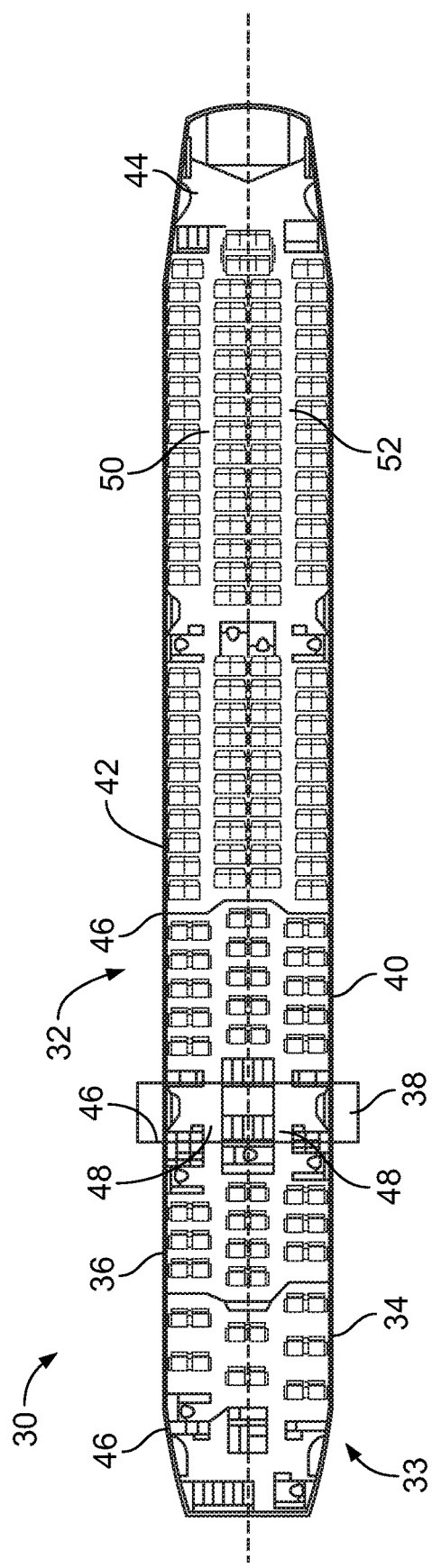
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
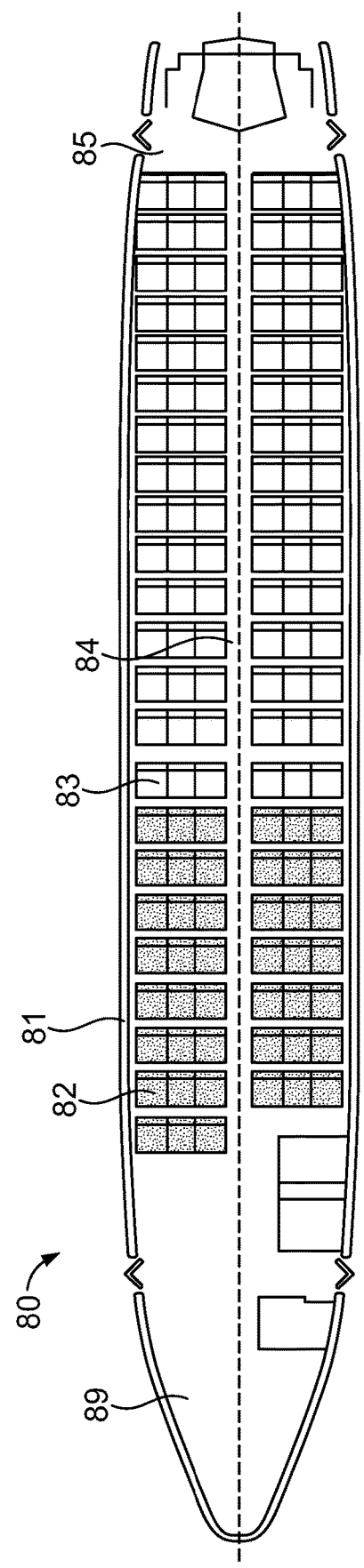
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a cockpit 89, a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Referring to FIGS. 2A and 2B, the internal cabin may be defined by walls, a floor, and a ceiling. Various portions of the internal cabin, such as the walls and floor, may be formed by interior panels. The interior panels may be composite panels. Accent lighting systems may be secured to various interior panels within the internal cabin to provide desired lighting effects throughout the internal cabin. For example, the accent lighting systems may be secured to interior panels within the ceiling and/or walls of the internal cabin. Each accent lighting system includes an accent adapter assembly that securely couples to a light source. The light source may be an attendant work light, an overhead reading light, or the like that is certified for use within the internal cabin. In at least one embodiment, an accent adapter assembly is retrofit to an existing light source within the interior cabin.

Alternatively, instead of an aircraft, embodiments of the present disclosure may be used with various other vehicles, such as automobiles, buses, locomotives and train cars, watercraft, spacecraft, and the like.

Figure 3:
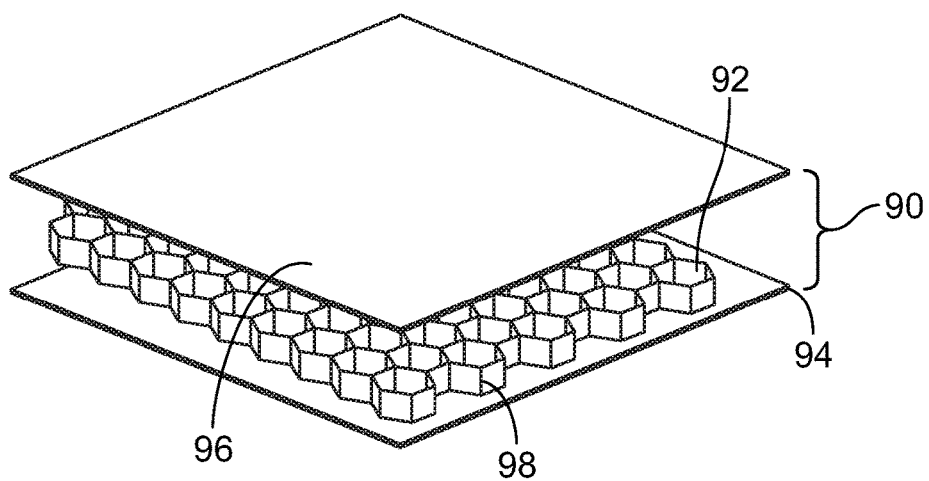
FIG. 3 illustrates a perspective exploded view of a composite panel, according to an embodiment of the present disclosure.

FIG. 3 illustrates a perspective exploded view of a composite panel 90, according to an embodiment of the present disclosure. The composite layer 90 includes a core 92 sandwiched between opposed first and second skins 94 and 96. The core 92 may include a plurality of interconnected honeycomb cells 98. In at least one other embodiment, the core 92 may be a solid layer or porous foam layer. The core 92 may be formed of aramid fibers, and/or polyamides, for example. The first and second skins 94 and 96 may be or include one or more pre-impregnated epoxy resin layers that include fibers, such as fiberglass, graphite, Kevlar, and/or the like. The first and second skins 94 and 96 may be identical to one another. In at least one other embodiment, the first and second skins 94 and 96 may include more or less layers than one another. Optionally, instead of a composite panel, an interior panel of a vehicle may be formed from various other materials, such as plastic, metal, and/or the like.

In at least one embodiment, an accent lighting system is configured to be secured to the composite panel 90. For example, the composite panel 90 may form a portion of a ceiling or wall within a galley, passenger area, cockpit, or the like within an internal cabin of an aircraft. An aperture may be formed through the composite panel 90. An accent adapter assembly of the accent lighting system is secured within the aperture. A light source is secured to the accent adapter assembly.

Figure 4:
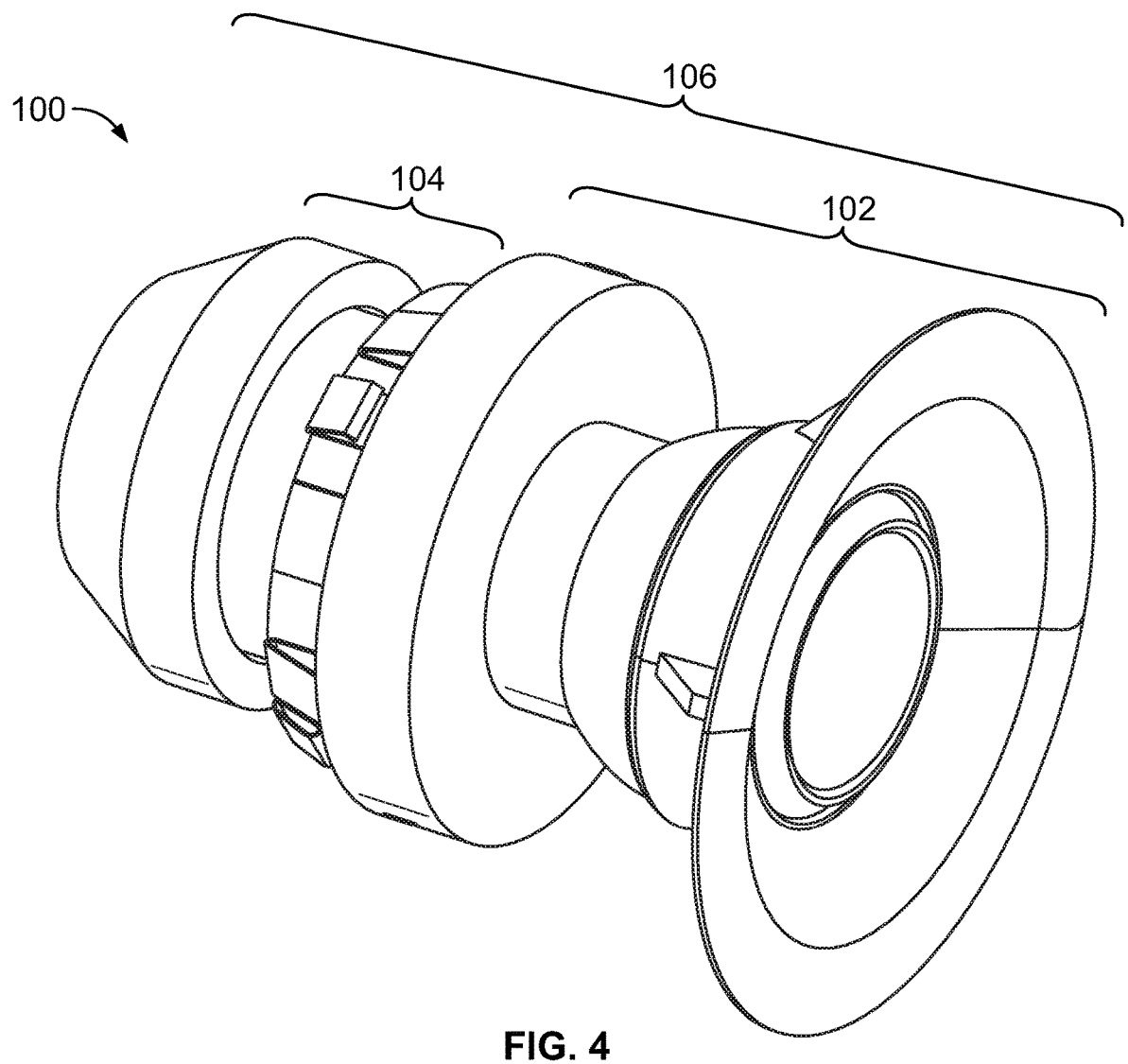
FIG. 4 illustrates a perspective lateral view of an accent lighting system, according to an embodiment of the present disclosure.

FIG. 4 illustrates a perspective lateral view of an accent lighting system 100, according to an embodiment of the present disclosure. The accent lighting system 100 includes an accent adapter assembly 102 securely coupled to a light source 104. The accent adapter assembly 102 is configured to provide accents (such as image, text, logo, or other such effects) to light emitted by the light source 104. For example, the accent adapter assembly 102 may include an accenting (for example, gobo) plate (such as a mask or slide) that is configured to provide accents to the light emitted by the light source 104. A gobo plate is a metal or plastic mask, slide, stencil, template, or the like that is positioned in front of a light source and used to control the shape of the light emitted from the light source.

The light source 104 may be configured for use within an internal cabin of a vehicle. For example, the light source 104 may be an attendant work light, an overhead reading light, a task light, and/or the like that is certified for use onboard an aircraft. In at least one embodiment, the light source 104 is an existing light source within an internal cabin of a vehicle, and the accent adapter assembly 102 is retrofit to the light source 104.

A length 106 of the accent lighting system 100 may be less than 4 inches. A length of the accent adapter assembly 102 may be less than 2 inches. It has been found that an overall length of less than 4 inches allows the accent lighting system 100 to be used at numerous locations within an internal cabin of an aircraft (which may include limited and confined spaces). For example, at locations within an internal cabin in which existing light sources are already in use, accent adapter assemblies (such as the accent adapter assembly 102) may be retrofit to the existing light sources without exceeding internal or external size limitations. Alternatively, the accent lighting system may be greater than 4 inches in length.

Figure 5:
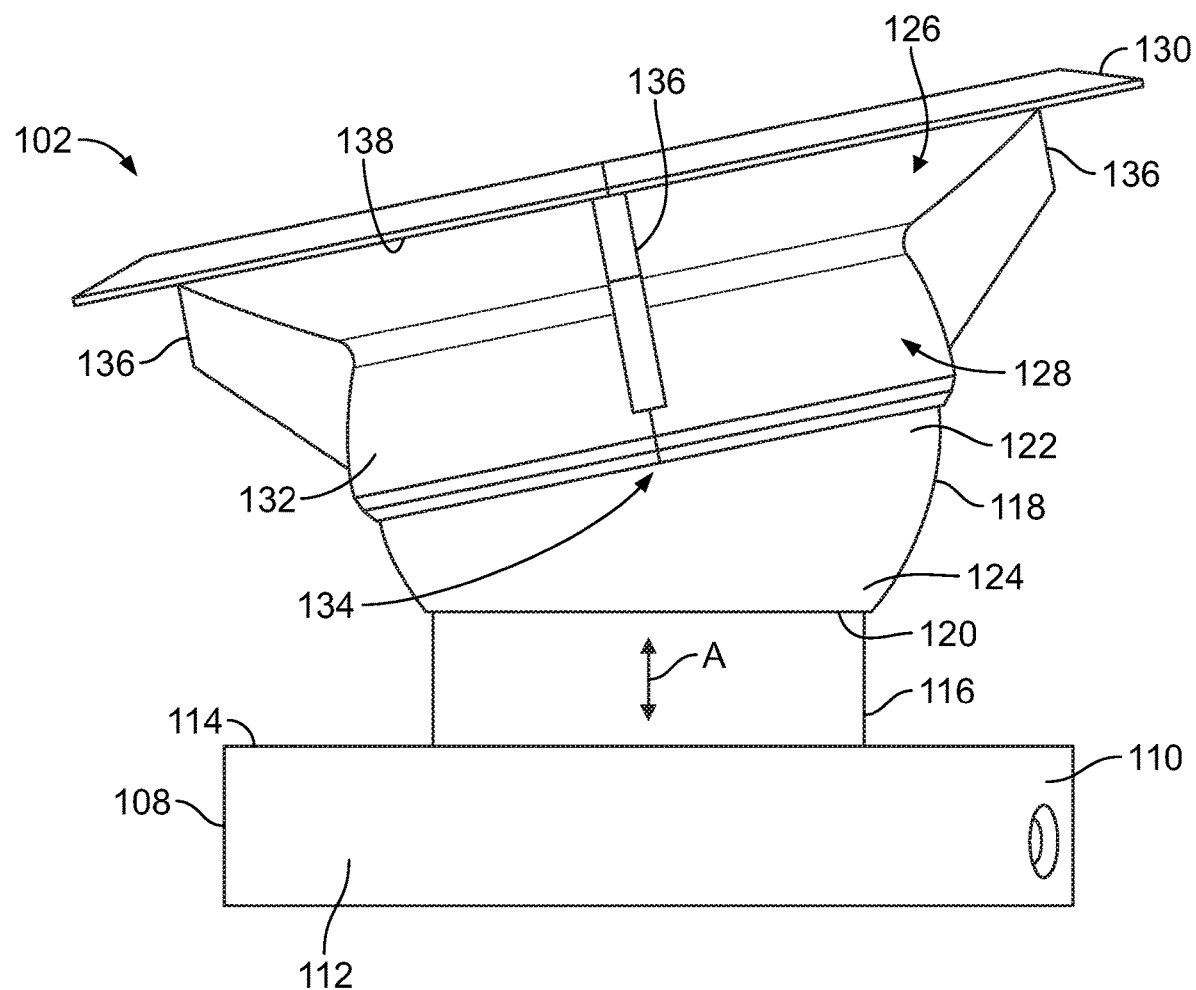
FIG. 5 illustrates a lateral view of an accent adapter assembly, according to an embodiment of the present disclosure.

FIG. 5 illustrates a lateral view of the accent adapter assembly 102, according to an embodiment of the present disclosure. The accent adapter assembly 102 may include a sleeve 108 having an annular base 110 defining an internal chamber (hidden from view in FIG. 5). The annular base 110 includes a circumferential wall 112 connected to a planar upper (as oriented in FIG. 5) wall 114. The circumferential wall 112 and the planar wall 114 define the internal chamber.

A mounting tube 116 upwardly extends from the planar upper wall 114. The mounting tube 116 may be a cylindrical tube that extends outwardly (upwardly, as shown in FIG. 5) from the upper wall 114. The mounting tube 116 defines a central passage (hidden from view in FIG. 5) that connects to the internal chamber of the base 110.

The accent adapter assembly 102 may also include an adjustment housing 118 that secures to an end 120 of the mounting tube 116. The adjustment housing 118 may have a semi-spherical main body 122 that defines an internal chamber (hidden from view) that connects to the central passage of the mounting tube 116. The adjustment housing 118 may be adjustably secured to the mounting tube 116. For example, in at least one embodiment, the end 120 of the mounting tube 116 may include external threads that are configured to threadably engage internal threads of a lower end 124 of the adjustment housing 118. In this manner, the adjustment housing 118 may threadably secure to the mounting tube 116. The threadable interface between the adjustment housing 118 and the mounting tube 116 allows the adjustment housing 118 to be axially adjusted (either extended or retracted) with respect to the mounting tube 116 in the directions of arrows A. As such, a distance between a lens within the mounting tube 116 and a lens within the adjustment housing 118 and/or a bezel 126 may be changed to adjust a focal length of the accent adapter assembly 102. In at least one other embodiment, the adjustment housing 118 and the mounting tube 116 may be telescopically secured to one another. Alternatively, the adjustment housing 118 may be fixed in relation to the mounting tube 116, thereby not allowing axial adjustment therebetween.

The bezel 126 is moveably coupled to the adjustment housing 118. The bezel 126 may include a securing base 128 connected to an outer circumferential flange 130. The securing base 128 includes an outer coupling wall 132 defining an interior chamber (hidden from view in FIG. 5). The outer coupling wall 132 provides a socket into which the semi-spherical adjustment housing 118 is positioned. As such, the bezel 126 may be radially adjusted with respect to a center 134 of the adjustment housing 118 by way of the securing base 128 pivoting over the semi-spherical main body 122. Alternatively, the bezel 126 may not be configured to be moveably adjusted with respect to the adjustment housing 118.

Stabilizers (such as fins, panels, or the like) 136 may extend between an underside 138 of the flange 130 and an outer surface of the coupling wall 132. More or less stabilizers 136 than shown may be used. The stabilizers 136 are configured to abut into or otherwise engage an internal edge of an interior panel that defines an aperture to securely stabilize the accent adapter assembly 102 within the aperture. The diameter of the flange 130 may be greater than the diameter of the aperture, while a diameter defined by an axial envelope defined by the stabilizers 136 is less than the diameter of the aperture, thereby allowing the stabilizers 136 to abut into the internal edges of the interior panel that define the aperture, while the flange 130 is blocked from passing into the aperture.

Figure 6:
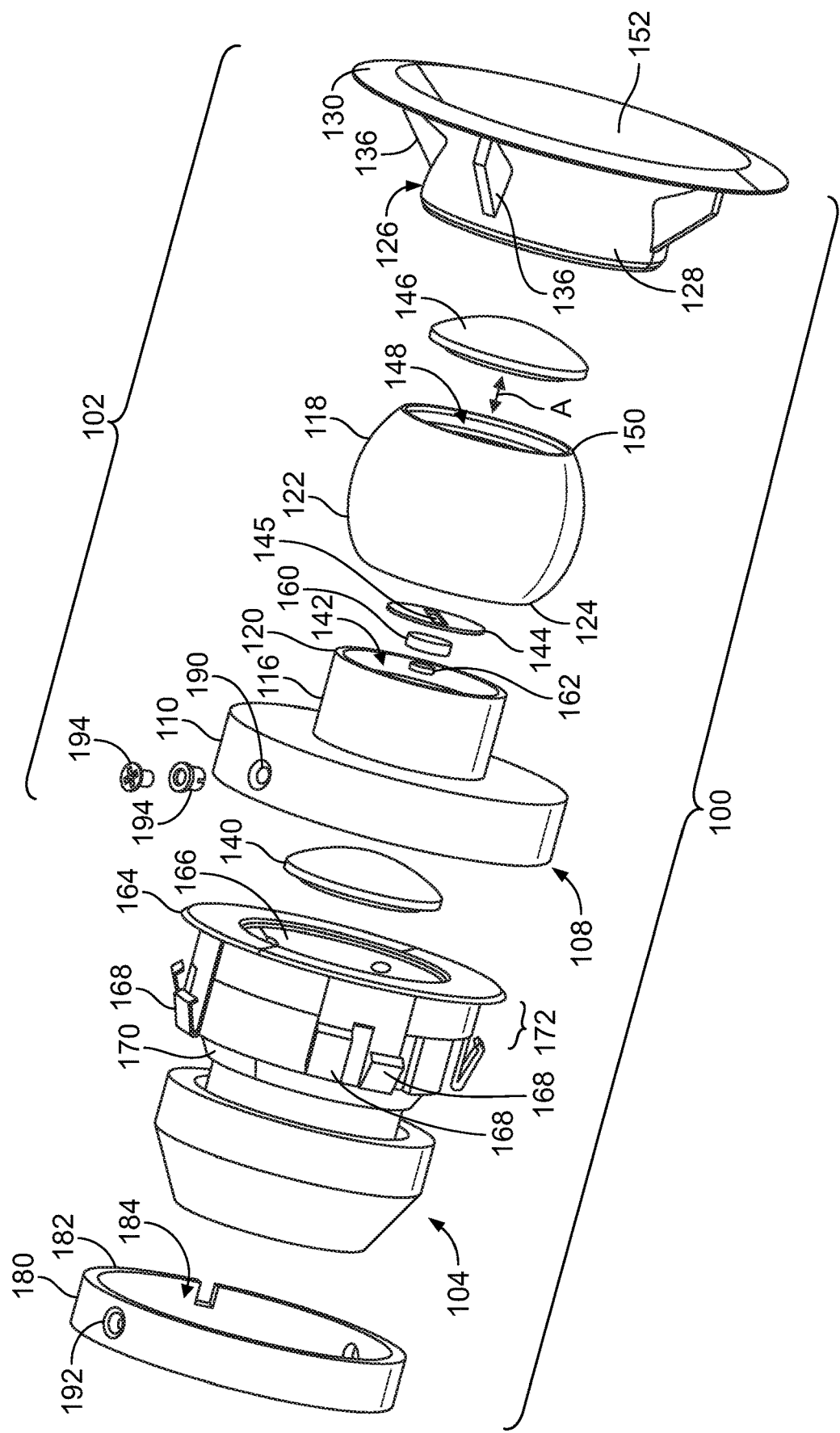
FIG. 6 illustrates a perspective lateral exploded view of an accent lighting system, according to an embodiment of the present disclosure.

FIG. 6 illustrates a perspective lateral exploded view of the accent lighting system 100, according to an embodiment of the present disclosure. In at least one embodiment, an accent lighting system 100 includes an optical component that is configured to be attached to an existing qualified light source. The optical component may be or include an accenting plate. A first lens 140 is secured within the sleeve 108. For example, the first lens 140 may be secured to a rim, bracket, or the like inwardly extending into the internal passage 142 of the mounting tube 116. Optionally, the first lens 140 may be secured within the base 110.

The accenting plate, such as a gobo plate 144, is also secured within the mounting tube 116. For example, the gobo plate 144 may be secured to a rim, bracket, or the like inwardly extending into the internal passage 142. The gobo plate 144 may be spaced apart from the first lens 140. For example, the gobo plate 144 may be secured at a position within the sleeve 108 a distance that is further away from the light source 104 than the first lens 140. Alternatively, the gobo plate 144 may be closer to the light source 104 than the first lens 140.

A second lens 146 is secured within the internal chamber 148 of the adjustment housing 118 proximate to an end 150 that is opposite the end 124. Optionally, the second lens 146 may be secured within the bezel 126. As described above, the adjustment housing 118 may be axially adjusted in the directions of arrows A to adjust the distance between the first and second lenses 140 and 146, respectively, to adjust the focal length of emitted light from the accent lighting system 100.

The bezel 126 includes a central opening 152 through which emitted light passes. A transparent cover or lens may be positioned over the central opening 152.

The accent adapter assembly 102 may include more or less lenses than shown. For example, the accent adapter assembly 102 may include three or more lenses. In at least one other embodiment, the accent adapter assembly 102 may include less than two lenses. Also, the accent adapter assembly 102 may include one or more reflectors 160 (such as mirrors) and/or one or more beam splitters 162, which may be secured within the sleeve 108, the adjustment housing 118, and/or the bezel 126. Optionally, the accent adapter assembly 102 does not include the reflectors 160 or the beam splitters 162.

As shown, the light source 104 includes an outer flange 164 surrounding a light emitting chamber 166. Retaining clips 168 may outwardly extend from a main body 170 of the light source 104 behind the outer flange 164. The retaining clips 168 are separated from the outer flange 164 a distance 172 that is generally the same magnitude as a thickness of an interior panel (such as the composite panel 90 shown in FIG. 3). In this manner, the light source 104 may be secured within an aperture of an interior panel, such that an internal edge of the interior panel that defines the aperture is sandwiched between the clips 168 and the outer flange 164.

In order to provide lighting effects to light emitted by the light source 104, the light source 104 may be removed from the interior panel. A coupling ring 180 is then secured to the light source 104 between the retaining clips 168 and the outer flange 164. The coupling ring 180 includes an annular wall 182 defining a central passage 184. A diameter of the central passage 184 is the same (or substantially the same) as the aperture of the interior panel from which the light source 104 was removed (or is otherwise sized to fit into). As such, the annular wall 182 is trapped between the retaining clips 168 and the outer flange 164.

The sleeve 108 of the accent adapter assembly 102 is then slid over the outer flange 164 and the coupling ring 180. One or more fastener through holes 190 of the base 110 of the sleeve 108 are then radially and axially aligned with fastener through holes 192 formed through the annular wall 182 of the coupling ring 180. One or more fasteners 194 (such as bolts, screws, nuts, rivets, and/or the like) are passed through the aligned fastener through holes 190 and 192 and engaged to securely fasten the accent adapter assembly 102 to the light source 104 by way of the coupling ring 180. Alternatively, the sleeve 108 may secure to the coupling ring 180 through integral snaps or clips, one or more adhesives, and/or the like.

Optionally, the coupling ring 180 may not be used. Instead, the sleeve 108 may be sized and shaped to directly couple to the light source 104 without use of the coupling ring 180.

As described above, the accent adapter assembly 102 secures to the light source 104 through the coupling ring 180. The light source 104 may be an existing light source on board a vehicle. As such, the accent adapter assembly 102 may be retrofit to the existing light source 104 through the coupling ring 180. The bezel 126 may then be secured to the aperture formed through the interior panel (in which the existing light source 104 was previously secured) as described above. In at least one embodiment, the size of the aperture may be expanded in order to accommodate the bezel 126. Optionally, the outer axial envelope of the bezel 126 behind the flange 130 may be the same as that of the light source 104 between the retaining clips 168 and the outer flange 164, such that the bezel 126 may secure to an unaltered aperture. Optionally, instead of retrofitting the accent adapter assembly 102 to a light source 104 that is already within an internal cabin, the light source 104 may be one that is not already secured within an internal cabin.

In operation, the light source 104 emits light through the light emitting chamber 166. The first lens 140 captures the light and directs it into the gobo plate 144, which masks or otherwise blocks portions of the emitted light, while allowing other portions to pass through one or more pattern openings 145 that provide an accent (such as a lighting effect) to the emitted light. The accented light than passes through the second lens 146, which focuses the accented light through the central opening 152 of the bezel 126 to a desired location. As noted, the distance between the first and second lenses 140 and 146 may be adjusted (such as through threadable engagement between the adjustment housing 118 and the mounting tube 116) to adjust a focal length of the accented light emitted out of the accent adapter assembly 102.

Reflectors 160 and/or beam splitters 162 may be disposed within or otherwise define (at least in part) a light path. The reflectors 160 and/or the beam splitters 162 may be used to re-direct the light within the accent adapter assembly 102, which may allow for a more compact accent lighting system 100 (in that the system 100 does not necessarily need to provide only a single linear light path). Further, the bezel 126 may be pivotally adjusted relative to the adjustment housing 118 to adjust a radial direction of the emitted accented light.

Figure 7:
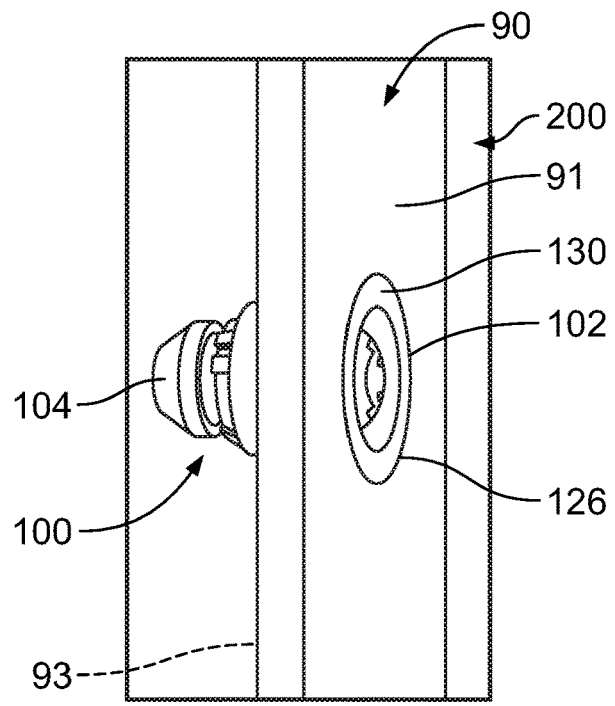
FIG. 7 illustrates a perspective lateral view of an accent lighting system secured to a composite panel within an internal cabin, according to an embodiment of the present disclosure.

FIG. 7 illustrates a perspective lateral view of the accent lighting system 100 secured to the composite panel 90 within an internal cabin 200, according to an embodiment of the present disclosure. The internal cabin 200 may be an internal cabin of a vehicle, such as the aircraft 10 shown in FIG. 1. For example, the internal cabin 200 is an example of either the internal cabin 30 of FIG. 2A or the internal cabin 80 of FIG. 2B.

The composite panel 90 may form a wall, ceiling, or floor portion of the internal cabin 200. The bezel 126 of the accent adapter assembly 102 is securely connected to the composite panel 90, such as within an aperture formed through the composite panel 90. A rear surface of the outer flange 130 may abut into an exposed surface 91 of the composite panel 90 that surrounds the aperture. The light source 104 is axially shifted behind a hidden (for example, rear) surface 93 of the composite panel 90 that is not exposed within the internal cabin 200.

Figure 8:
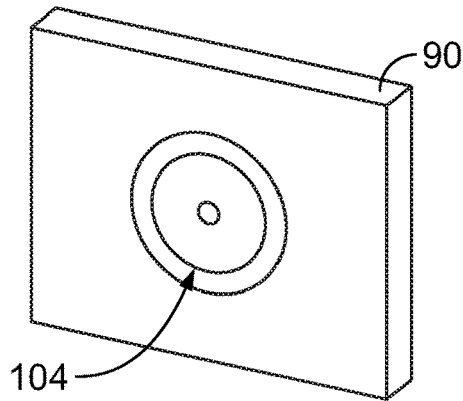
FIG. 8 illustrates a perspective front view of a light source secured to a composite panel, according to an embodiment of the present disclosure.

FIG. 8 illustrates a perspective front view of the light source 104 secured to the composite panel 90, according to an embodiment of the present disclosure. In order to retrofit the accent adapter assembly 102 to the light source 104, the light source 104 is first removed from the composite panel 90.

Figure 9:
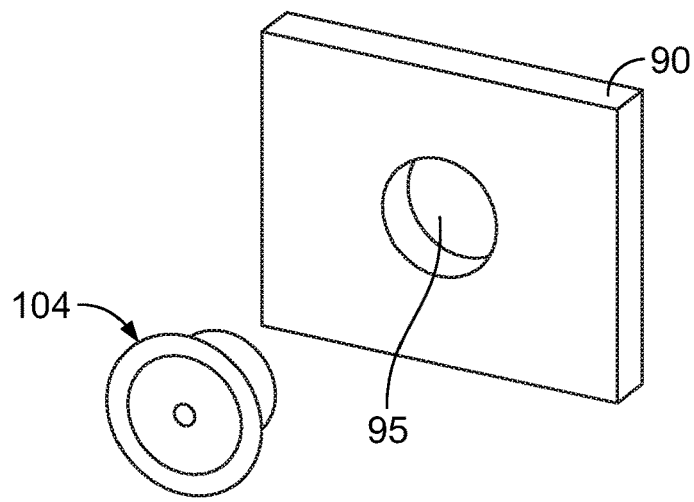
FIG. 9 illustrates a perspective front view of a light source removed from an aperture formed through a composite panel, according to an embodiment of the present disclosure.

FIG. 9 illustrates a perspective front view of the light source 104 removed from an aperture 95 formed through the composite panel 90, according to an embodiment of the present disclosure. After the light source 104 is removed from the aperture 95, the accent adapter assembly 102 may be securely coupled to the light source 104.

Figure 10:
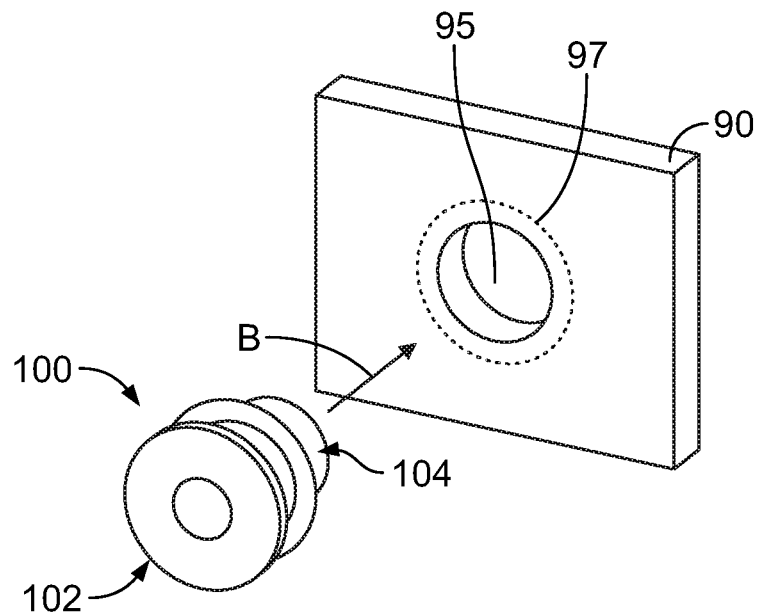
FIG. 10 illustrates an accent lighting system disconnected from a composite panel, according to an embodiment of the present disclosure.

FIG. 10 illustrates the accent lighting system 100 disconnected from the composite panel 90, according to an embodiment of the present disclosure. The accent adapter assembly 102 may be securely connected to the light source 104, as described above, to form the accent lighting system 100. In at least one embodiment, the aperture 95 may be slightly expanded (for example, increase in cross-sectional area between 1-5%) to an increased size 97 in order to accommodate the accent adapter assembly 102. In order to secure the accent lighting system 100 to the composite panel 90, the accent lighting system 100 is urged into the aperture 95 (with the light source 104 leading into the aperture 95) in the direction of arrow B. The aperture 95 may be expanded through drilling, cutting, milling, laying up the composite panel 90 and curing it around a mandrel, and/or the like. In at least one embodiment, the expansion of the aperture 95 may be forming the aperture 95 through a portion of the composite panel 90 where no previous aperture existed.

Figure 11:
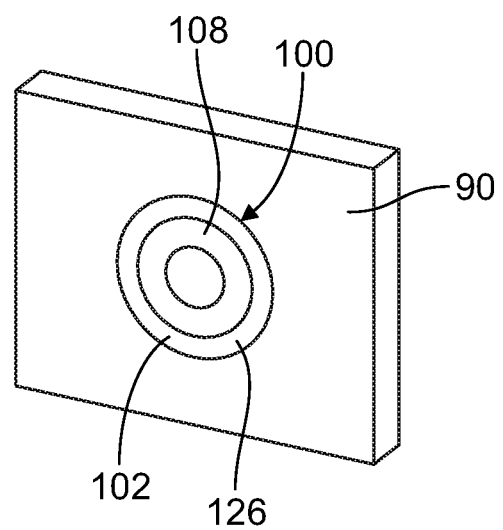
FIG. 11 illustrates an accent lighting system secured to a composite panel, according to an embodiment of the present disclosure.

FIG. 11 illustrates the accent lighting system 100 secured to the composite panel 90, according to an embodiment of the present disclosure. The accent lighting system 100 may emit accented light onto a desired location. The adjustment housing 118 may be radially pivoted with respect to the bezel 126 in various directions to change a radial direction of the emitted accented light.

Figure 12:
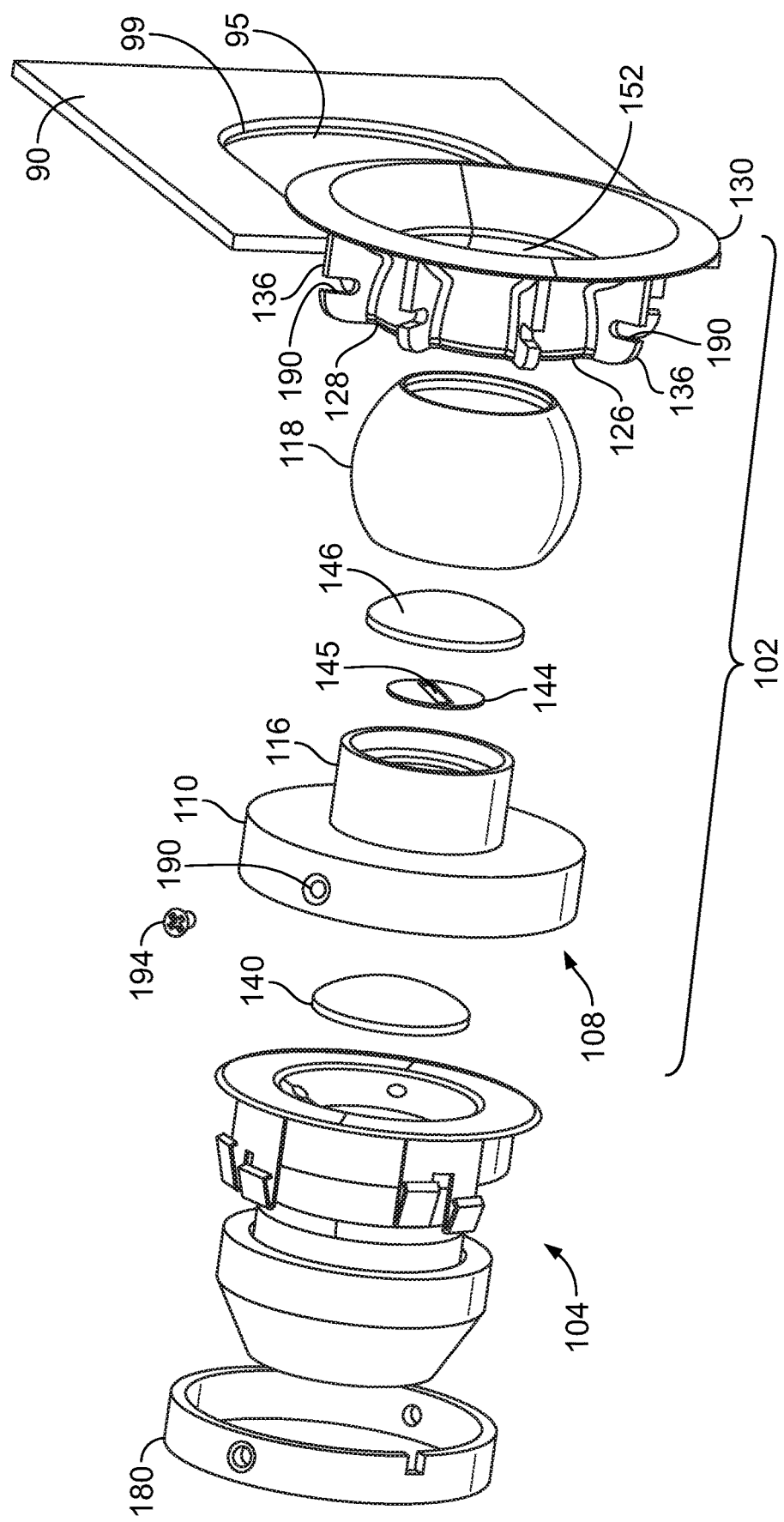
FIG. 12 illustrates a perspective lateral exploded view of an accent lighting system in relation to a composite panel, according to an embodiment of the present disclosure.

FIG. 12 illustrates a perspective lateral exploded view of the accent lighting system 100 in relation to the composite panel 90, according to an embodiment of the present disclosure. In this embodiment, the stabilizers 136 of the bezel 126 may include slots 190 formed therethrough. Internal edges 99 of the composite panel 90 that define the aperture 95 are configured to be securely retained within the slots 190, thereby securely coupling the bezel 126 (and therefore the accent lighting system 100) to the composite panel 90.

Figure 13:
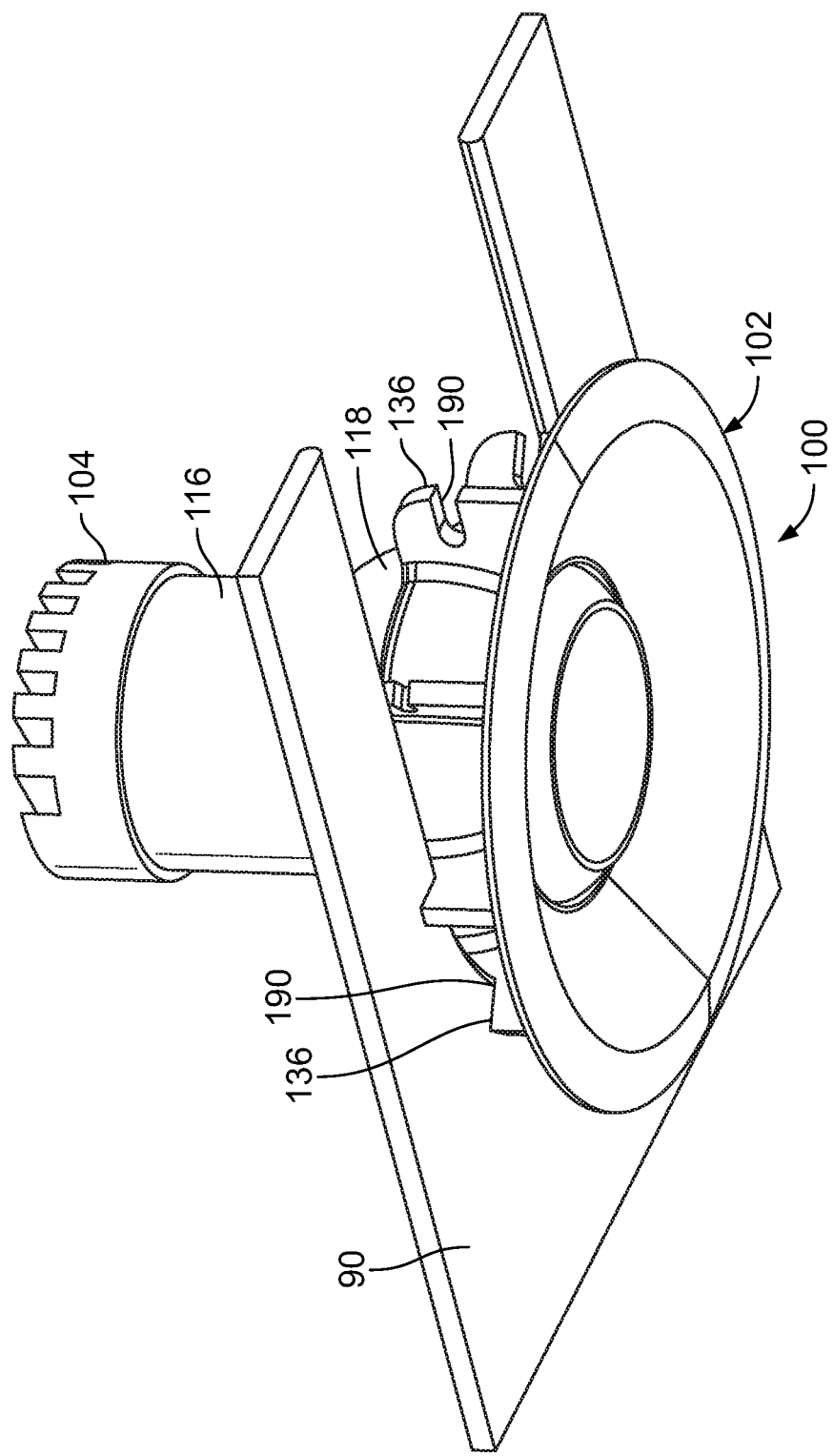
FIG. 13 illustrates a perspective bottom view of an accent lighting system secured to a composite panel, according to an embodiment of the present disclosure.

FIG. 13 illustrates a perspective bottom view of the accent lighting system 100 secured to the composite panel 90, according to an embodiment of the present disclosure. As shown, the composite panel 90 may form a portion of a ceiling within an internal cabin.

Figure 14:
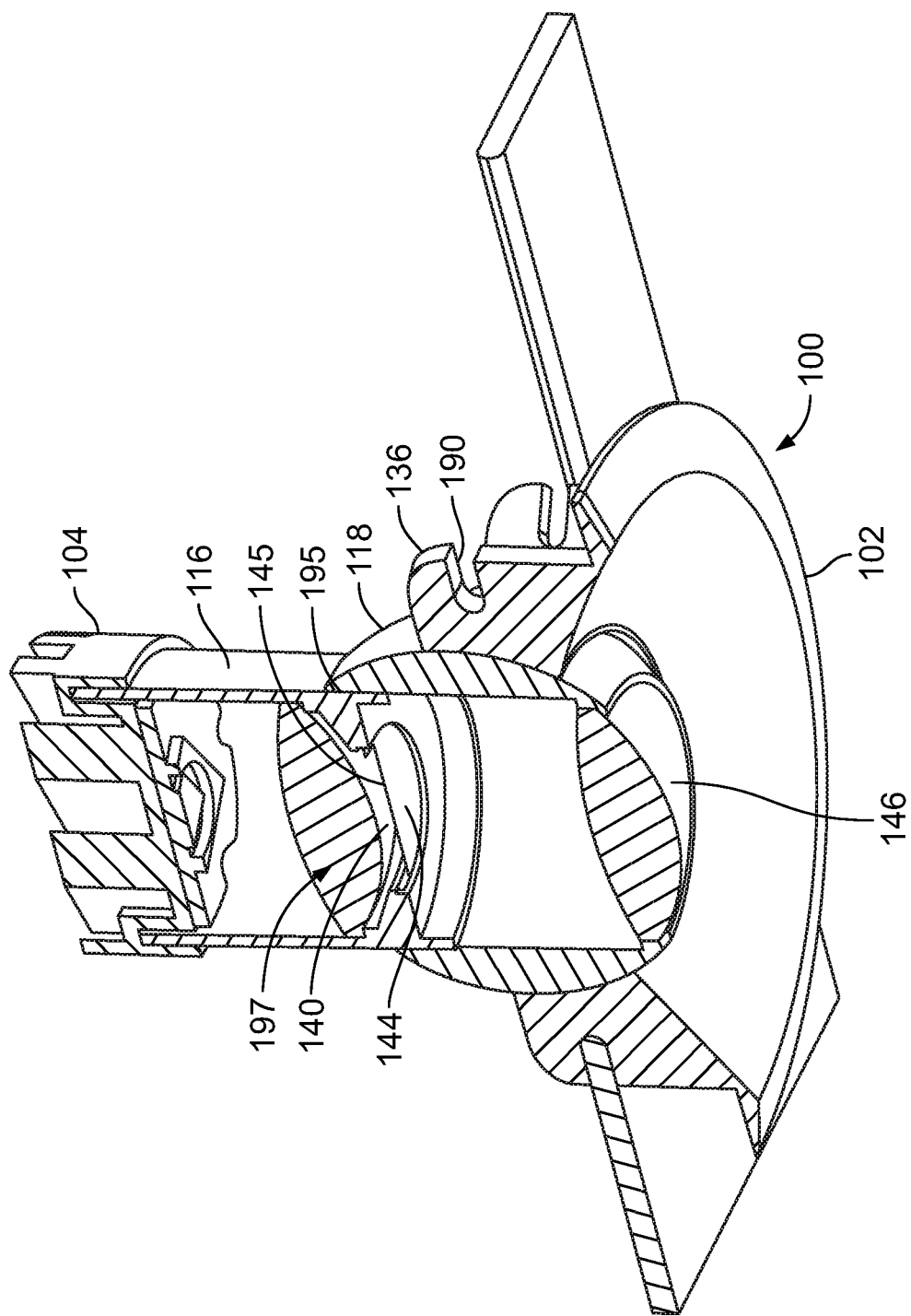
FIG. 14 illustrate a perspective bottom, partial cross-sectional view of an accent lighting system secured to a composite panel, according to an embodiment of the present disclosure.

FIG. 14 illustrate a perspective bottom, partial cross-sectional view of the accent lighting system 100 secured to the composite panel 90, according to an embodiment of the present disclosure. A light path 197 is defined within the accent lighting system 100. The first and second lenses 140 and 146, as well as the gobo plate 144, are disposed within the light path 197. Light emitted from the light source 104 is emitted into the light path 197 and is captured by the first lens 140. The captured light is directed into the gobo plate 144 by the first lens 140. The gobo plate 144 accents the light by way of the pattern opening(s) 145. The accented light is then directed through the second lens 146, which focuses the accented light onto a desired location.

The distance between the first and second lenses 140 and 146 may be changed by adjusting the adjustment housing 118 with respect to the mounting tube 116. For example, the adjustment housing 118 may be axially adjusted (for example, extended or retracted) with respect to the mounting tube 116 through a threadable interface 195 between an outer surface of the mounting tube 116 and an inner surface of the adjustment housing 118. Adjustment of the axial position of the adjustment housing 118 with respect to the mounting tube 116 changes the distance between the lenses 140 and 146, and therefore the focal length of the accented light emitted out of the accent lighting system 100.

Figure 15:
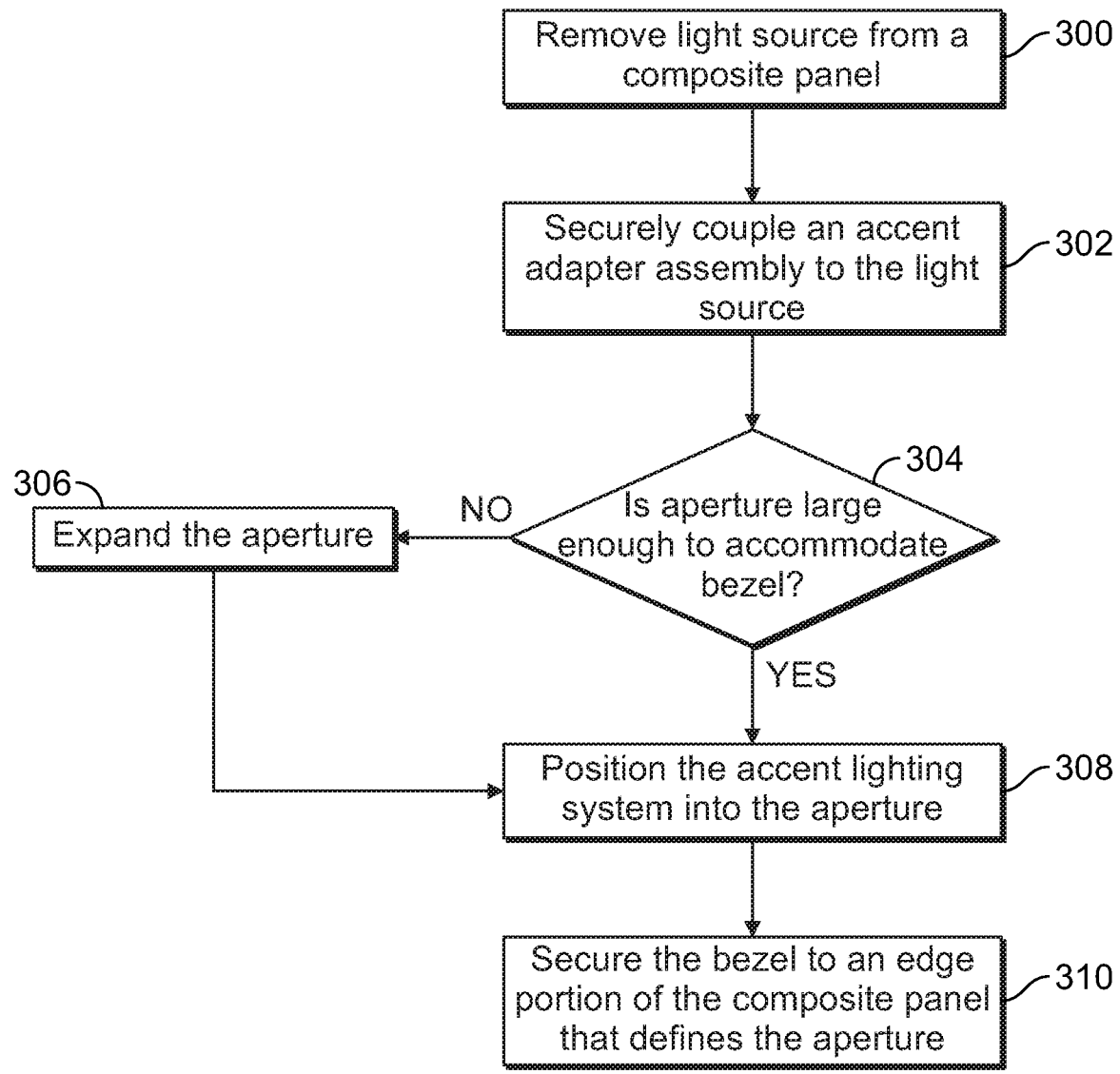
FIG. 15 illustrates a flow chart of a method of securing an accent lighting system within an internal cabin of a vehicle, according to an embodiment of the present disclosure.

FIG. 15 illustrates a flow chart of a method of securing an accent lighting system within an internal cabin of a vehicle, according to an embodiment of the present disclosure. The method begins at 300, in which an existing light source is removed from a composite panel. At 302, an accent adapter assembly is securely coupled to the existing light source.

At 304, it is determined whether an aperture formed through the composite panel is large enough to accommodate a bezel of the accent adapter assembly. If not, the method proceeds from 304 to 306, in which the aperture is expanded (such as through cutting, drilling, milling, or the like). The method then proceeds from 306 to 308, in which the accent lighting system (that includes the light source and the accent adapter assembly) is positioned into the aperture. If at 304, the aperture is large enough to accommodate the bezel, the method proceeds directly from 304 to 308. At 310, the bezel is secured to an edge portion of the composite panel that defines the aperture.

As described above, embodiments of the present disclosure provide cost-effective, lightweight, and adaptable systems, methods, and assemblies that are configured to provide lighting effects within an internal cabin of an aircraft. Because an existing light source within an internal cabin may be retrofit with an accent adapter assembly, the resulting accent lighting system may not require additional certification for use within the internal cabin.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An accent lighting system that is configured to provide accented light onto a desired location, the accent lighting system comprising:
    an accent adapter assembly that couples to a light source, wherein the accent adapter assembly comprises an accenting plate that blocks portions of light that is emitted from the light source,
    a sleeve that is configured to securely couple to the light source, wherein the sleeve includes a base that is configured to securely couple to the light source, and a mounting tube;
    an adjustment housing having first and second ends, wherein the first end is secured to the mounting tube; and
    a bezel comprising a securing base coupled to the second end of the adjustment housing, and an outer flange that is configured to be positioned over an aperture of a panel.

2. The accent lighting system of claim 1, wherein the accent adapter assembly further comprises a lens that is configured to capture the light emitted from the light source and direct the light into the accenting plate.

3. The accent lighting system of claim 1, wherein the accent adapter assembly further comprises a lens that is configured to focus accented light that passes through the accenting plate onto the desired location.

4. The accent lighting system of claim 1, further comprising a coupling ring secured to the light source, wherein the sleeve secures to the coupling ring.

5. The accent lighting system of claim 4, wherein the coupling ring defines a central passage that has a diameter that is substantially the same as a diameter of an aperture of a panel into which the light source is sized to secure into, and wherein the coupling ring has a thickness that is substantially the same as a thickness of the panel.

6. The accent lighting system of claim 1, wherein the accent adapter assembly further comprises: a first lens disposed within the sleeve, wherein the accenting plate is disposed within the sleeve; and a second lens disposed within the adjustment housing.

7. The accent light system of claim 6, wherein a distance between the first and second lenses is adjustable.

8. The accent lighting system of claim 1, wherein the first end of the adjustment housing is adjustably secured to the mounting tube.

9. The accent lighting system of claim 1, wherein the adjustment housing includes a semi-spherical main body, and wherein the securing base of the bezel is pivotally secured to the semi-spherical main body.

10. The accent lighting system of claim 1, wherein the accent adapter assembly further comprises one or both of a reflector or beam splitter within a light path.

11. The accent lighting system of claim 1, wherein the light source comprises an existing light source within an internal cabin of a vehicle, wherein the light source is removed from a panel within the internal cabin and coupled to the accent adapter assembly to form the accent lighting system, and wherein the accent lighting system is secured to the panel.

* * * * *